US012657995B2

(12) United States Patent
Yerby et al.

(10) Patent No.: US 12,657,995 B2
(45) Date of Patent: Jun. 16, 2026

(54) SIGNALING UPON CONTACT TRAJECTORY HAVING LIKELIHOOD FOR INTERSECTION BY USE OF A DIVERSION VEHICLE

(71) Applicant: Truist Bank, Charlotte, NC (US)

(72) Inventors: Dennis W. Yerby, Richmond, VA (US); FNU Ankita, Atlanta, GA (US)

(73) Assignee: TRUIST BANK, Charlotte, NC (US)

( * ) Notice: Subject to any disclaimer, the term of this patent is extended or adjusted under 35 U.S.C. 154(b) by 233 days.

(21) Appl. No.: 18/401,778

(22) Filed: Jan. 2, 2024

(65) Prior Publication Data

US 2025/0218248 A1 Jul. 3, 2025

(51) Int. Cl.
*G07F 17/32* (2006.01)
*G06N 3/08* (2023.01)

(52) U.S. Cl.
CPC ............. *G07F 17/323* (2013.01); *G06N 3/08* (2013.01); *G07F 17/3237* (2013.01)

(58) Field of Classification Search
CPC ...... G07F 17/323; G07F 17/3237; G06N 3/08
See application file for complete search history.

(56) References Cited

U.S. PATENT DOCUMENTS

| | | | | |
|---|---|---|---|---|
| 2019/0043063 A1* | 2/2019 | Johnsen | ................. | G06Q 50/01 |
| 2020/0043040 A1 | 2/2020 | Mannix | | |
| 2020/0342319 A1 | 10/2020 | Katz | | |
| 2024/0104816 A1* | 3/2024 | Shaw | ...................... | A63F 13/58 |
| 2025/0022052 A1* | 1/2025 | Schlicher | ................. | H04L 9/50 |

FOREIGN PATENT DOCUMENTS

WO 2018071433 A1 4/2018

OTHER PUBLICATIONS

Mir et al., Effects of Pre-Purchase Search Motivation on User Attitudes Toward Online Social Network Advertising: A Case of University Students., https://cjournal.cz/files/170.pdf, Journal of Competitiveness, 2014 (Year: 2014).

* cited by examiner

*Primary Examiner* — Jeffrey K Wong
(74) *Attorney, Agent, or Firm* — Michael A. Springs, Esq.; Shumaker, Loop & Kendrick, LLP; Patrick B. Horne

(57) ABSTRACT

In a system for signaling a networked device with a contact trajectory having capacity for intersection with a diversion vehicle a computing system of a first entity performs steps including, for each of multiple users: receiving input and output event signals and storing corresponding records associated with the user, discriminating, for some of the records, a digital diversion attribute; calculating and forward tracking a contact trajectory and determining a capacity for intersection of the specific user entity with at least one first-entity dispatched diversion vehicle; and upon the determined capacity satisfying at least one threshold criterion: establishing an operative connection over the network connection between the computing system and a specific user device associated with the specific user entity; and sending a signal via the operative connection to the specific user device for display, by the specific user device, information at least identifying the first-entity dispatched diversion vehicle.

20 Claims, 8 Drawing Sheets

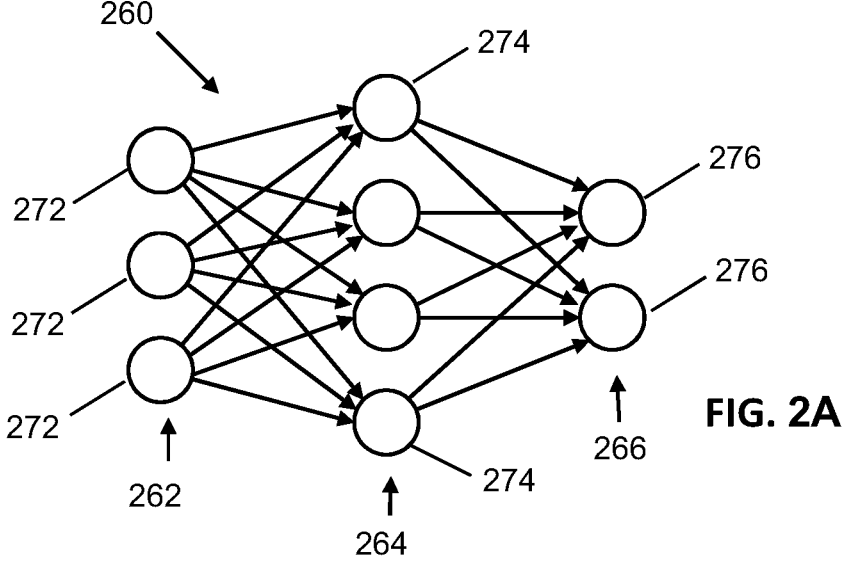
FIG. 2A
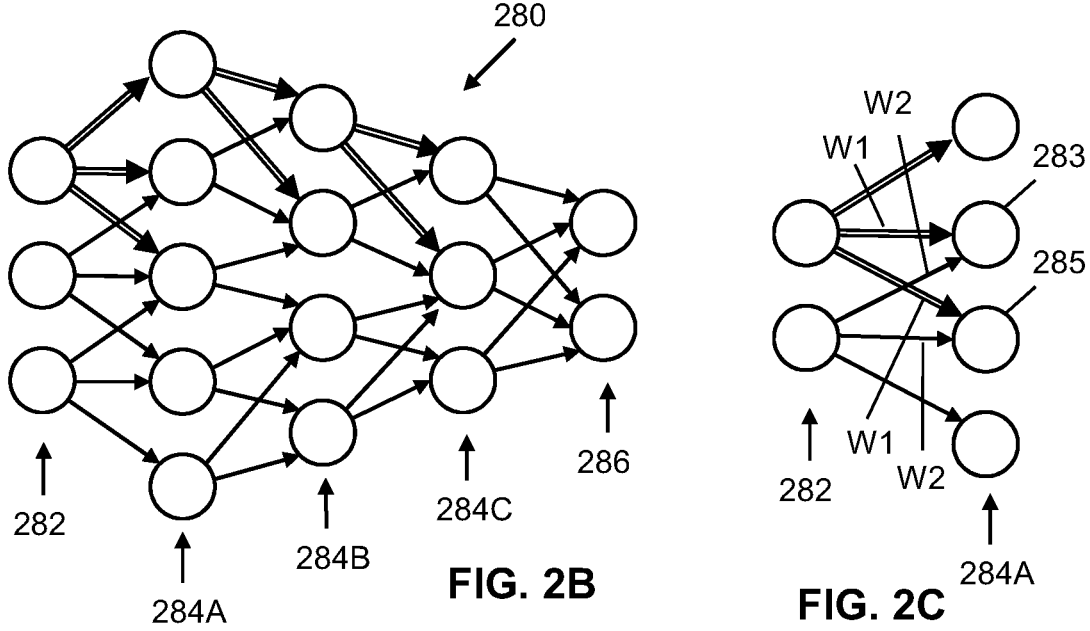
FIG. 2B
FIG. 2C

SIGNALING UPON CONTACT TRAJECTORY HAVING LIKELIHOOD FOR INTERSECTION BY USE OF A DIVERSION VEHICLE

FIELD

This invention relates generally to predicting user likelihood of use of diversion vehicles such as gaming, and to discriminating user activities as having or being digital diversion attributes, for example by use of artificial intelligence (AI).

BACKGROUND

Many user entities and their service providers are unaware of high-level patterns in their data flows. Conventional paper flow handling of information and resources has been largely replaced by use of computerized data storage and digital transactions. This opens opportunities for informatics previously unavailable, particularly for example through machine learning and artificial intelligence (AI).

Gaming can be used for both enjoyment and education, representing an expanding engagement mode for educating consumers with regard to products and services. Many subjects can be perused in gaming contexts, including products and services serving as investment vehicles and other pursuits tailored for and beneficial to the user. In the interest of focusing resources, providers prefer to efficiently identify a likely client base instead of wide casting marketing efforts and content.

BRIEF SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

In some embodiments, a system for signaling a networked device with a contact trajectory having capacity for intersection with a diversion vehicle is disclosed. The system includes: a computing system of a first entity including one or more processor and at least one of a memory device and a non-transitory storage device, wherein said one or more processor executes computer-readable instructions; and a network connection operatively connecting user devices to the computing system. Upon execution of the computer-readable instructions, the computing system performs steps including, for each specific user entity of multiple user entities: receiving input event signals and storing corresponding input event records associated with the specific user entity, each of the input event records representing a respective quantized input event; incrementing, respectively for each one of at least some of the input event records, one or more respective quantized resource of the specific user entity by a respective input quantity, the respective input quantity fetched by the first entity from a respective other party; receiving output event signals and storing corresponding output event records associated with the specific user entity, each of the output event records representing a respective quantized output event; decrementing, respectively for each one of at least some of the output event records, a respective output quantity from the one or more quantized resource of the specific user entity, the respective output quantity discharged by the first entity; discriminating, for at least some of the output event records, a respective at least one digital diversion attribute; calculating a contact trajectory based at least in part on each output event record for which a respective at least one digital diversion attribute is discriminated; forward tracking the contact trajectory and determining a capacity for intersection of the specific user entity with at least one first-entity dispatched diversion vehicle; and upon the determined capacity satisfying at least one threshold criterion: establishing an operative connection over the network connection between the computing system and a specific user device associated with the specific user entity; and sending a signal via the operative connection to the specific user device for display, by the specific user device, information at least identifying the first-entity dispatched diversion vehicle.

The first-entity dispatched diversion vehicle may include and/or be a gaming application.

Sending a signal via the operative connection to the specific user device may include sending at least one of: information about the gaming application, a link for download or use of the gaming application, and an invitation to play the gaming application.

Discriminating a respective at least one digital diversion attribute may include using a computer-implemented model trained by machine-learning.

The model may be trained by machine-learning comprises an artificial neural network.

The artificial neural network may be trained using an iterative training algorithm using positive correlation examples and negative correlation examples.

The capacity for intersection of the specific user entity may include or be a numeric ranking; and satisfying at least one threshold criterion may include or be the numeric ranking meeting or exceeding a numeric value.

Prior to establishing the operative connection over the network connection and sending the signal via the operative connection, the computing system may confirm the specific user entity does not utilize the first-entity dispatched diversion vehicle.

In a system for signaling a networked device with a contact trajectory having capacity for intersection with a diversion vehicle, to which system the above examples and options apply as well, a computing system of a first entity includes one or more processor and at least one of a memory device and a non-transitory storage device, wherein said one or more processor executes computer-readable instructions; a network connection operatively connecting user devices to the computing system. Upon execution of the computer-readable instructions, the computing system performs steps comprising, for each specific user entity of multiple user entities: storing output event records associated with the specific user entity, each of the output event records representing a respective quantized output discharged from one or more quantized resource of the specific user entity; discriminating, for at least some of the output event records, a respective at least one digital diversion attribute; calculating a contact trajectory based at least in part on each output event record for which a respective at least one digital diversion attribute is discriminated; forward tracking the contact trajectory to determine a capacity for intersection of the specific user entity with at least one first-entity dispatched diversion vehicle; and upon the determined capacity satisfying at least one threshold criterion: establishing an operative connection over the network connection between the computing system and a specific user device associated with the specific user entity; and sending a signal via the network connection to the specific user device for display, by the specific user device, information at least identifying the first-entity dispatched diversion vehicle.

A method, to which the above examples and options apply as well, is disclosed for a computing system of a first entity to signal a networked device with a contact trajectory having capacity for intersection with a diversion vehicle, the computing system of the first entity including one or more processor and at least one of a memory device and a non-transitory storage device. A network connection operatively connects user devices to the computing system. The method includes, upon execution of the computer-readable instructions by the one or more processor, the computing system performing steps including, for each specific user entity of multiple user entities: receiving input event signals and storing corresponding input event records associated with the specific user entity, each of the input event records representing a respective quantized input event; incrementing, respectively for each one of at least some of the input event records, one or more respective quantized resource of the specific user entity by a respective input quantity, the respective input quantity fetched by the first entity from a respective other party; storing output event records associated with the specific user entity, each of the output event records representing a respective quantized output event; decrementing, respectively for each one of at least some of the output event records, a respective output quantity from the one or more quantized resource of the specific user entity, the respective output quantity discharged by the first entity; discriminating, for at least some of the output event records, a respective at least one digital diversion attribute; calculating a contact trajectory based at least in part on each output event record for which a respective at least one digital diversion attribute is discriminated; forward tracking the contact trajectory and determining a capacity for intersection of the specific user entity with at least one first-entity dispatched diversion vehicle; and, upon the determined capacity satisfying at least one threshold criterion: establishing an operative connection over the network connection between the computing system and a specific user device associated with the specific user entity; and sending a signal via the operative connection to the specific user device for display, by the specific user device, information at least identifying the first-entity dispatched diversion vehicle.

The above summary is to be understood as cumulative and inclusive. The above and below described features are to be understood as combined in whole or in part in various embodiments whether expressly described herein or implied by at least this reference. For brevity, not all features are expressly described and illustrated as combined with all other features. No combination of features shall be deemed unsupported for merely not appearing expressly in the drawings and descriptions.

BRIEF DESCRIPTION OF THE SEVERAL VIEWS OF THE DRAWINGS

Figure 1A:
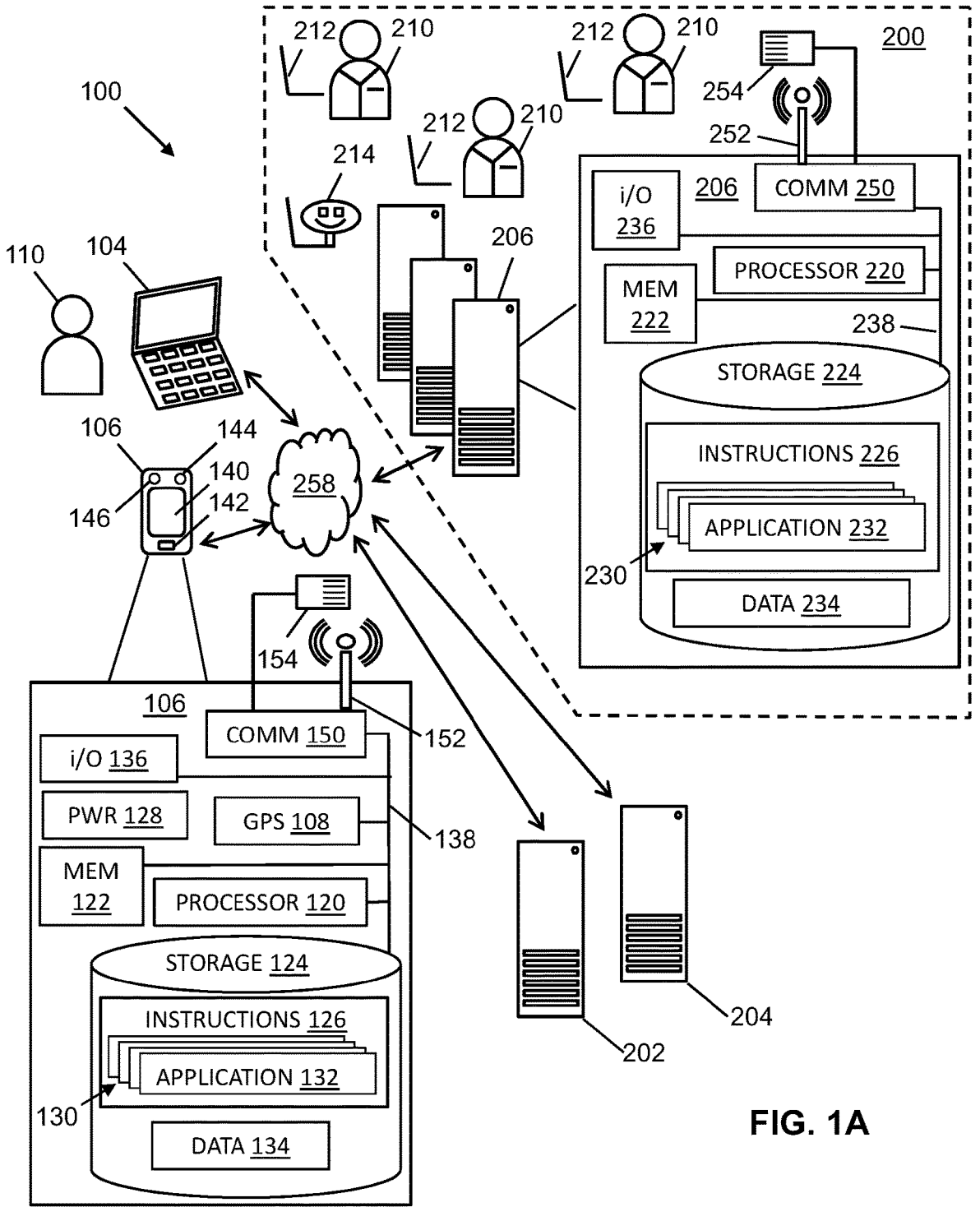

Having thus described embodiments of the invention in general terms, reference will now be made to the accompanying drawings, wherein:

FIG. 1A illustrates an enterprise system, and environment thereof, according to at least one embodiment.

Figure 1B:
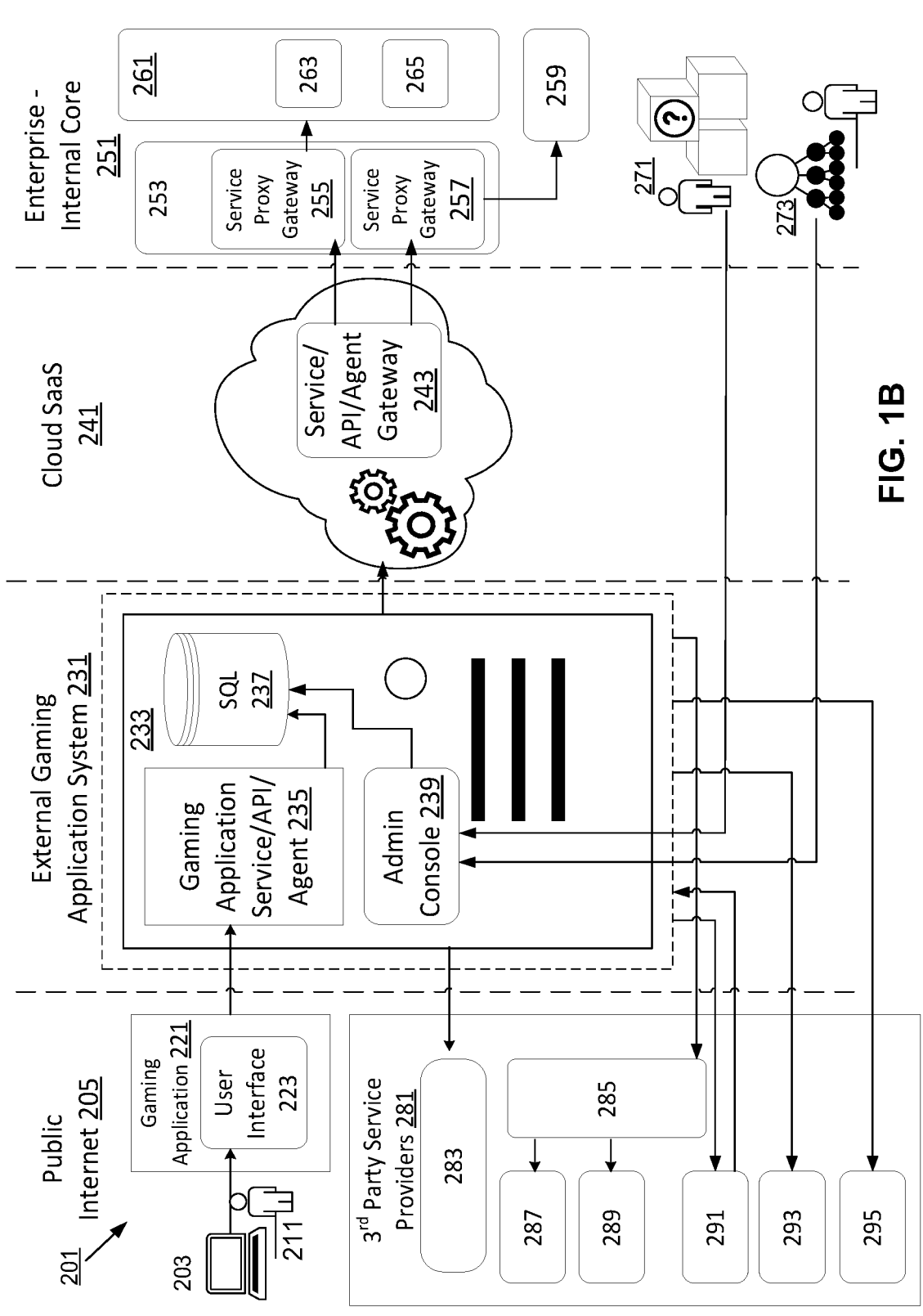

FIG. 1B depicts an example flow diagram for network communication associated with an external gaming application system.

FIG. 2A is a diagram of a feedforward network, according to at least one embodiment, utilized in machine learning

FIG. 2B is a diagram of a convolutional neural network (CNN), according to at least one embodiment, utilized in machine learning.

FIG. 2C is a diagram of a portion of the convolutional neural network of FIG. 2B, according to at least one embodiment, illustrating assigned weights at connections or neurons.

Figure 3:
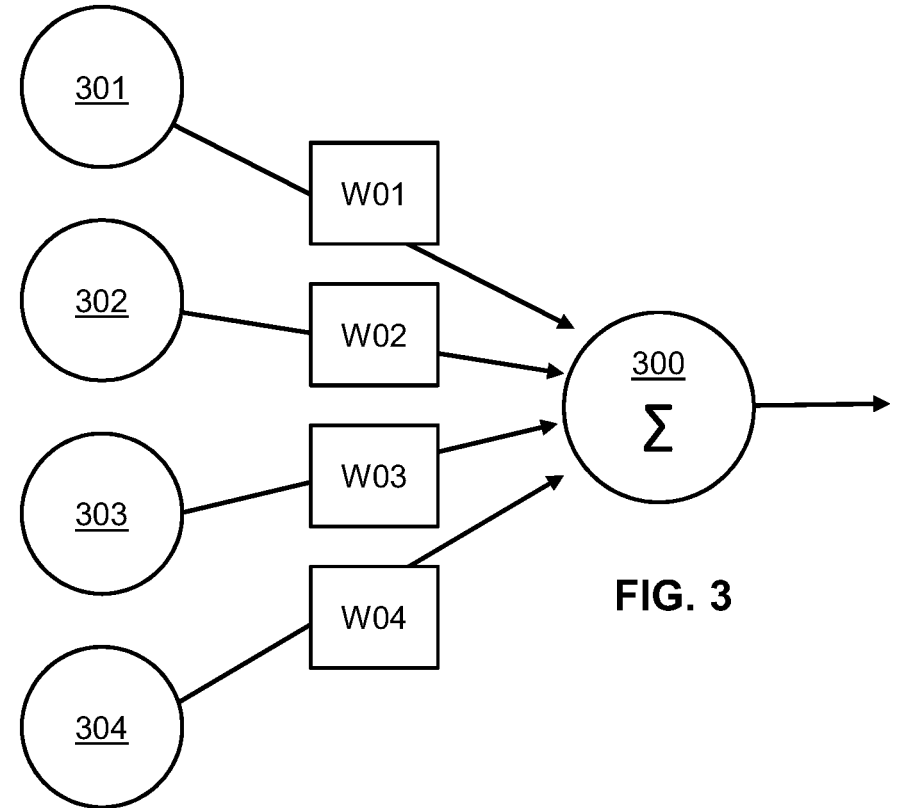

FIG. 3 is a diagram representing an exemplary weighted sum computation in a node in an artificial neural network.

Figure 4:
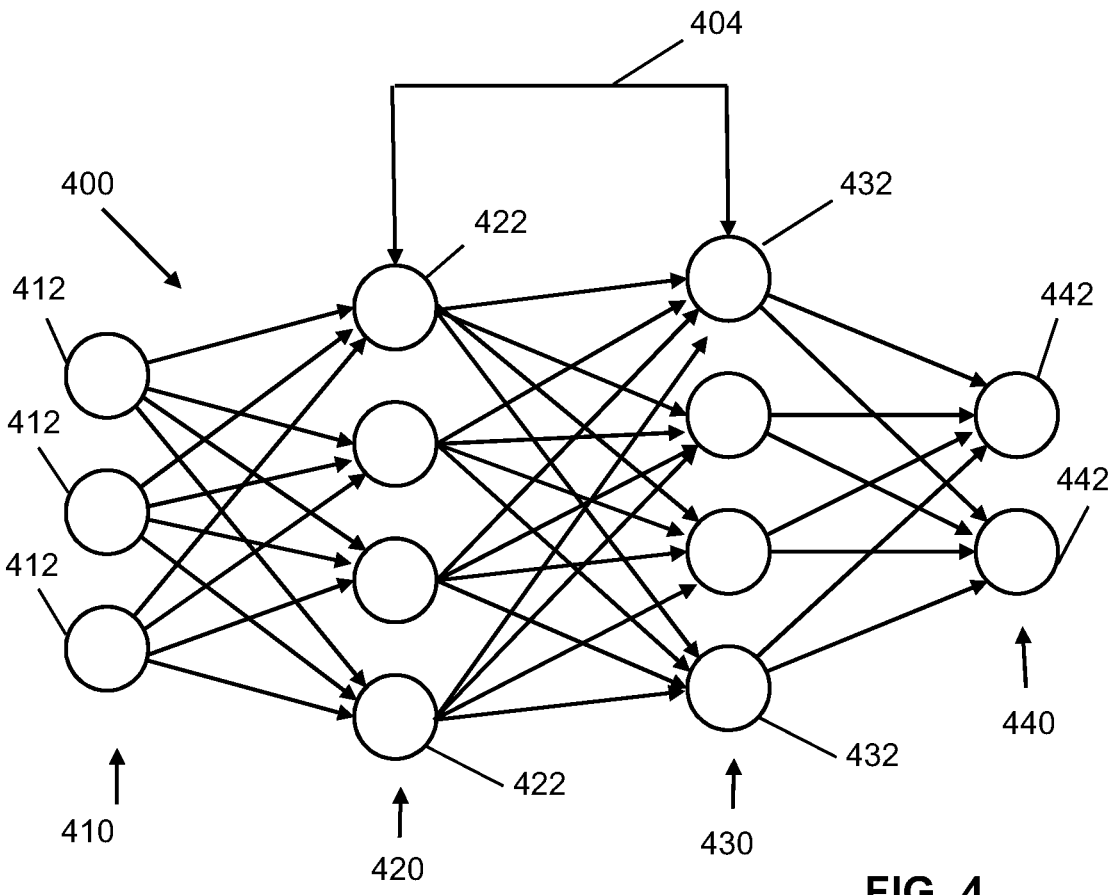

FIG. 4 is a diagram of a Recurrent Neural Network RNN, according to at least one embodiment, utilized in machine learning.

Figure 5:
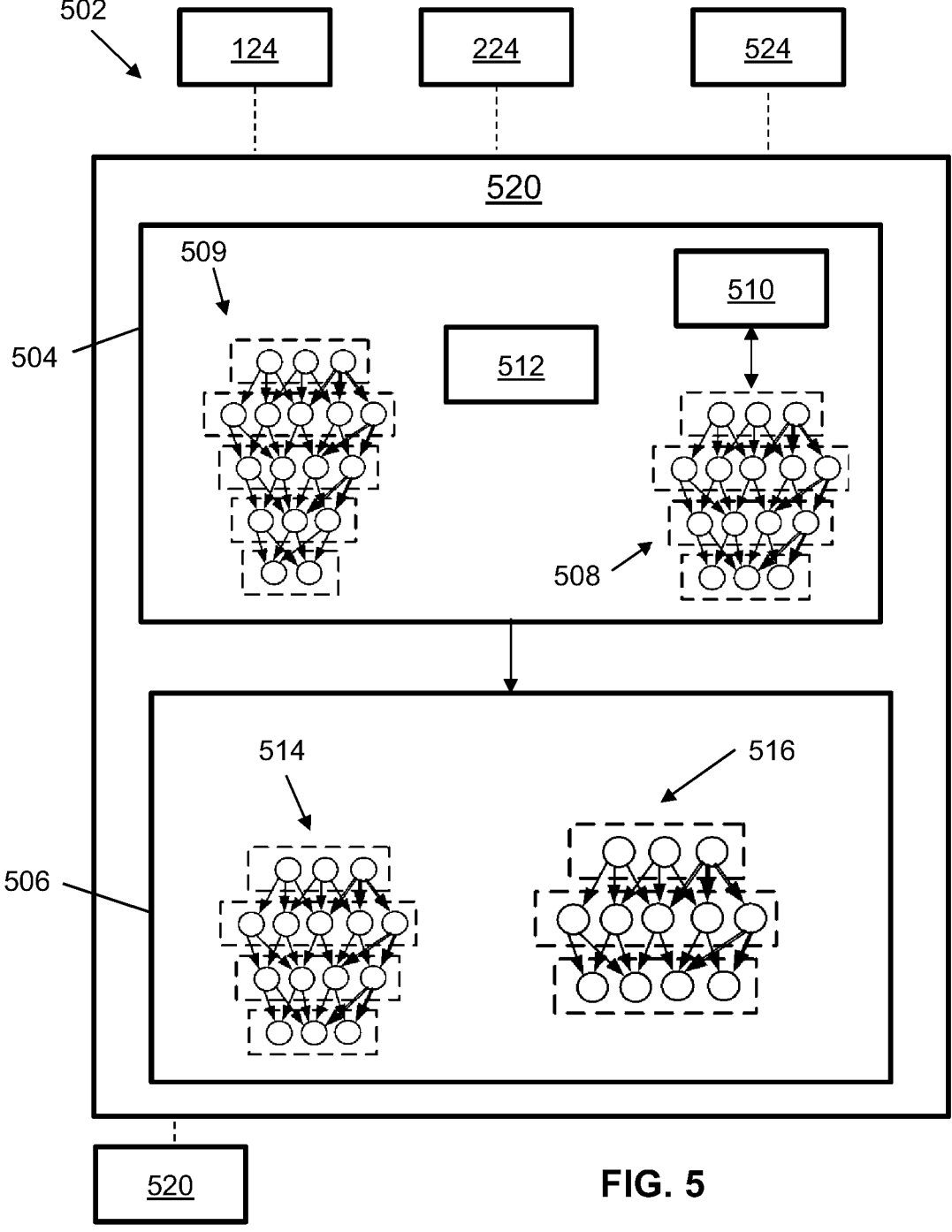

FIG. 5 is a schematic logic diagram of an artificial intelligence program including a front-end and a back-end algorithm.

Figure 6:
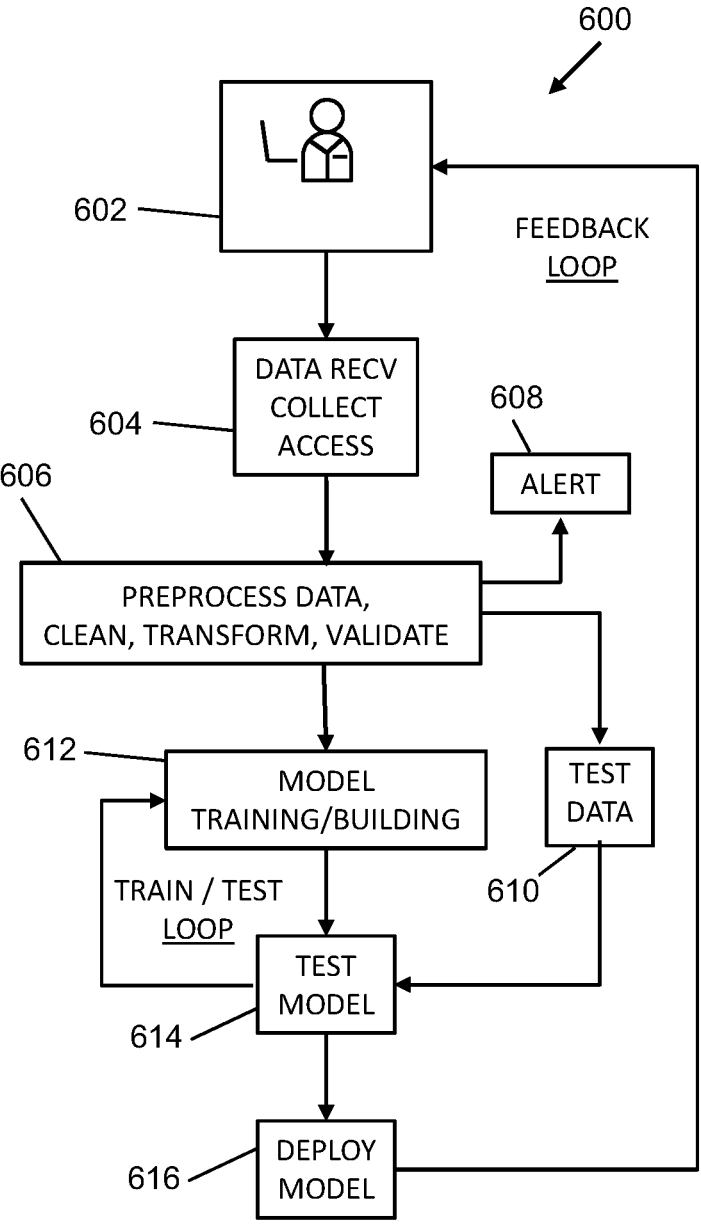

FIG. 6 is a flow chart representing a method, according to at least one embodiment, of model development and deployment by machine learning.

Figure 7:
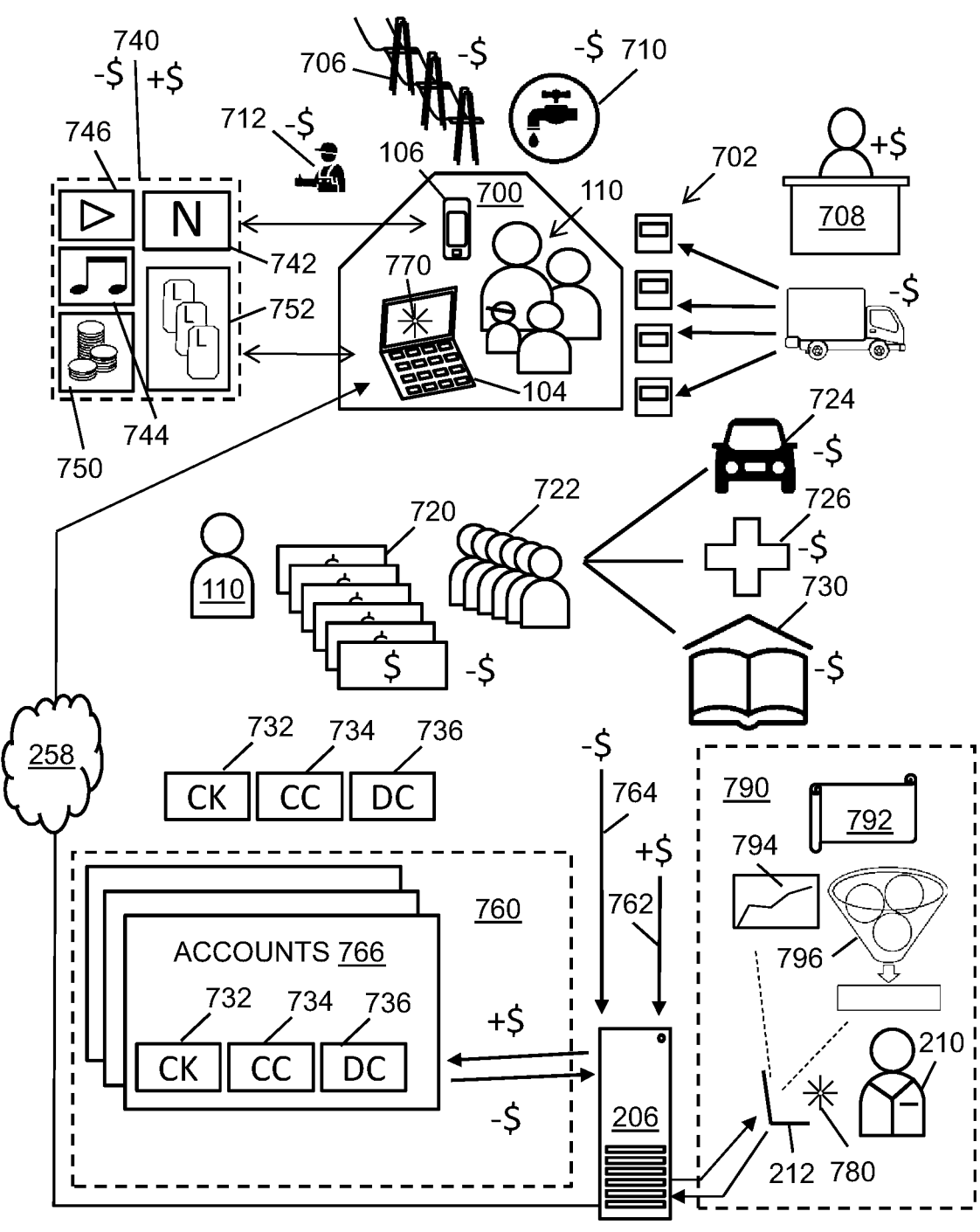

FIG. 7 represents an implementation of systems and methods for tracking discharges and user entities, discriminating digital diversion attributes thereof, and signaling to agent devices and/or user devices.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1A illustrates a system 100 and environment thereof, according to at least one embodiment, by which a user 110 benefits through use of services and products of a computing system reference as an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1A as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/ or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

In some embodiments, a credentialed system enabling authentication of a user may be necessary in order to provide access to the enterprise system 200. In one embodiment, the input and output system 136 may be configured to obtain and process various forms of authentication to authenticate a user 110 prior to providing access to the enterprise system 200. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95

(code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wide-band (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1A applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1A.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1A. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1A, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

According to one embodiment, a user 110 may initiate an interaction with the enterprise system 200 via the user device 104, 106 and based thereon the enterprise system 200 may transmit, across a network 258, to the user device 104, 106 digital communication(s). In order to initiate the interaction, the user 110 may select, via display 140, a mobile application icon of a computing platform of the enterprise system 200, login via a website to the computing platform of the enterprise system 200, or perform various other actions using the user device 104, 106 to initiate the interaction with the enterprise system 200. In other embodiments, the enterprise system 200 may initiate the interaction with the user 110 via the user device 104, 106. For instance, periodically the enterprise system 200 may transmit unprompted communication(s) such as a short message service (SMS) text message, multimedia message (MMS), or other messages to the user device 104, 106 that includes an embedded link, a web address (e.g., a uniform resource locator (URL)), a scannable code (e.g., a quick response (QR) code, barcode, etc.) to prompt the user 110 to interact with the enterprise system 200.

Once an interaction has been established between the enterprise system 200 and the user device 104, 106, data and/or other information may be exchanged via data transmission or communication in the form of a digital bit stream or a digitized analog signal that is transmitted across the network 258. Based on the user 110 of the user device 104, 106 providing one or more user inputs (e.g., via the user interface, via a speech signal processing system, etc.) data may be received by the enterprise system 200 and data processing is performed thereon using, for example, processing device 220. This received data may then be stored to the storage device 224 or to a third party storage resource such as, for example, external systems 202, 204, which may include a cloud storage service or remote database. Additionally, this collected response data may be aggregated in order to allow the enterprise to have a sampling of responses from multiple users 110. Such aggregated data may be accessible by a relational database management system (e.g., Microsoft SQL server, Oracle Database, MySQL, PostgreSQL, IBM Db2, Microsoft Access, SQLite, MariaDB, Snowflake, Microsoft Azure SQL Database, Apache Hive, Teradata Vantage, etc.) or other software system that enables users to define, create, maintain and control access to information stored by the storage device 224, database, and/or other external systems 202, 204. According to one embodiment, the relational database management system may maintain relational database(s) and may incorporate structured query language (SQL) for querying and updating the database. The relational database(s) may organize data into one or more tables or "relations" of columns (e.g., attributes) and rows (e.g., record), with a unique key identifying each row. According to various embodiments, each table may represent a user/customer profile and the various attributes and/or records may indicate attributes attributed to the user/customer.

For instance, the user/customer profiles may be classified based on various designations/classifiers such as their financial assets, income, bank account types, age, geographic region(s), etc. Each designation/classifier may also include a plurality of sub categories. Storing the collected data to the relational database of the relational database management system may facilitate sorting of the data to filter based on various categories and/or subcategories and/or performing data analytics thereon. According to some embodiments, the enterprise system 200 may utilize algorithms in order to categorize or otherwise classify the data.

The collected data may also have metadata associated therewith that can be accessed by the enterprise system 200. The metadata may include, for example, (i) sequencing data representing the data and time when the response data was created, (ii) modification data indicating the individual (such as user 110) that last modified specific information/data, (iii) weighting data representing the relative importance or magnitude of the attributes, (iv) provider identifier data identifying the owner of the data (e.g., the entity that operates the enterprise system 200), and/or (v) other types of data that could be helpful to the enterprise in order to classify and analyze the collected data.

According to one embodiment, the relational database(s) may store data associated with user/customer profiles in order to sync this data with a gaming functionality and/or application. In particular, the enterprise system 200 may include an enterprise mobile software application that includes a gaming functionality that may be installed on or otherwise accessed by the user device 104, 106. When the user 110 accesses the gaming functionality, the user 110 may be rewarded by performing various tasks. In particular, the user 110 may receive rewards for accomplishing various goals related to financial wellness. The gaming functionality may help the user develop smart financial habits with monetary rewards for developing these habits and is rooted in behavioral economics.

In general, the gaming application disclosed herein may operate via external systems 202, 204 and provides front-end functionalities that enable the user 110 to interact with games. In particular, the external systems 202, 204 may host the game server(s). In one embodiment, the external systems 202, 204 include Amazon Web Services (AWS), which provides a workflow for developing, deploying, and hosting the gaming application. Further, the games may incorporate user/customer profiles that may be linked to that specific user's/customer's profile that is stored within or otherwise associated with the enterprise system 200. By syncing the user/customer profile for the gaming application with the user/customer profile of the enterprise system 200, the gaming application can access information about the user 110 that is derived from the user/customer profile of the enterprise system 200. This enables the gaming application to utilize user/customer data in order to personalize the game in accordance with various enterprise objectives. In a non-limiting example, user/customer data stored by the enterprise system 200 that indicates current account balances may be accessed by the game server(s) of the external system 202, 204 in order to personalize the gaming experience for the user 110 by encouraging certain financial behaviors. Other external system 202, 204 may include promotional prize server(s) that can be configured to generate one or more random numeric outcomes based on one or more rules defining a win likelihood.

To perform various functionalities associated with the gaming application, the game server(s) may be configured to make an API call to the prize server(s) to provide information necessary to generate a random numeric outcome. For instance, the API call may indicate a current game at a current level, and the prize server(s) process the information provided to generate a random number based on that information in accordance with various rules defining a win likelihood. The prize server(s) then provide results from the random number generator, which is used to determine a monetary reward in response to the actions performed by the user 110. In addition, the monetary rewards obtained as a result of performing various actions via the gaming application may be transferred to user/customer accounts identified by the user/customer profile of the enterprise.

FIG. 1B depicts an example flow diagram 201 for network communication associated with an external gaming application system 231, in accordance with an embodiment of the present invention. In particular, the flow diagram 201 depicts a user 211 providing one or more inputs, via a user device 203, to access the gaming application 221 across a public network 205 (e.g., public internet). The gaming application 221 includes a user interface 223 through which the user 211 interacts in order to play electronic game(s) (i.e., video game(s)). The game(s) may be played when the user 211 interacts via the user interface 223 and/or through other input device(s) (e.g., a joystick, controller, keyboard, motion sensing device, etc.). Inputs provided by the user 211 may generate visual feedback through a display of the user device 203.

The gaming application 221 is configured to communicate with an external gaming application system 231 that include server(s) 233 that are used to host the gaming application 221. Example cloud-based sever(s) 233 include, for example, AWS. The cloud-based server(s) 233 that host the gaming application 221 include the gaming application service/API/agent 235 that receives an API call from the gaming application 221. The API call utilizes a uniform resource identifier (URI), such as a URL, that identifies the cloud-based server(s) 233, incorporates the application layer protocol (e.g., the HTTP method) indicating the desired action to be performed by the service/API/agent 235 (e.g., the data to be extracted, the functionality to be performed, etc.), includes a header so that the service/API/agent 235 understands the request, and includes an API key or access token used by the service/API/agent 235 to authenticate the API call. The service/API/agent 235 accesses data from the relational database 237 (e.g., SQL database), which may include a collection of structured data needed for the gaming application 221 to integrate various features. The admin console 239 is used by support and developers to provide administrative functions (e.g., provide support for customers, check on the health of the external gaming application system, etc.).

The external gaming application system is integrated with a cloud SaaS 241, which is configured to receive API calls from the cloud-based server(s) 233 to access user data associated with a user profile of the user 211. In a non-limiting example, the user data includes information associated with financial services and products offered by the enterprise such as direct deposit information, current financial balance information, financial savings information, financial transaction history, etc.). The cloud SaaS 241 includes a service/API/agent gateway 243, which acts an edge gateway or network entry point for the enterprise-internal core system 251. The service/API/agent gateway 243 may provide, according to one embodiment, network translation between networks that use different protocols and may include routers, routing switches, multiplexers, etc. In one particular embodiment, the service/API/agent gateway 243 includes various permissions to perform calls to fetch the user data.

Retrieval of user data within the enterprise-internal core system 251 is facilitated by use of service proxy gateway(s) 255, 257 of the gateway platform 253. The gateway platform 253 is a multichannel API gateway configured to provide security, control, integration and optimized access to fetch user data. The service proxy gateway(s) 255, 257 are modules that receive the API requests and forward them to defined endpoints within the internal enterprise system 261. In particular, the service proxy gateway(s) 255, 257 facilitate load balancing, access filtering, caching, etc. The internal enterprise system 261 includes an API-powered business ecosystem that enables the enterprise to perform various backend services and business functionalities. The internal enterprise system 261 includes service/API/agent systems 263, 265 that can be used to access the user data from original data sources and used to facilitate payments from a holding account of the cloud-based server(s) 233 so that the financial payments can be transferred to deposit account(s) associated with the user profile of the user 211. According to various embodiments, the financial payments may be made according to a predefined schedule and/or in response to a request from the user 211. The enterprise-internal core system 251 also includes a digital identity and authentication system 259 that is used to authenticate the user 211 and link the user's gaming profile/account to their user profile associated with the enterprise. The enterprise internal core system 251 is also used by support agents 271 to provide customer support, resolve customer inquiries, etc. Further, the enterprise-internal core system 251 is used by administrators 273 to provide administrative functions for the external gaming application system 231.

Various third-party service providers 281 are also integrated with the external gaming application system 231. One example third-party service provider includes a game operator system 283 that includes promotional prize server(s) that can be configured to generate one or more random numeric outcomes based on one or more rules defining a win likelihood. A communication provider 285 may provide digital communications such as electronic messages through a communications platform 287 and push notifications through an operating system 289. A marketing analysis platform 291 may be used to analyze the efficacy of various messaging and communications associated with the gaming application system 231 and can provide feedback that can be used by the gaming application system 231 to modify functionalities to align with enterprise objectives. For example, the marketing analysis platform 291 may be used for inbound marketing channel attribution and outbound marketing channel attribution so that the enterprise may determine how marketing tactics influence customer interactions. A monitoring system provider 293 may provide off-duty support to detect problems with the gaming application system 231 by using real-time monitoring. When a problem is detected, the monitoring system provider 293 distributes an alert so that the problem can be resolved. An analytics provider 295 may analyze ways in which users interact with the gaming application system 231 in order to perform user experience analysis. Various additional or alternative third-party service providers 281 may also be utilized according to various embodiments.

In other embodiments, the gaming application 231 is not external to the enterprise internal core 251. Rather, a gaming application may be integrated within the enterprise internal core 251, which advantageously eliminates use of the cloud SaaS 241. In particular, cloud-based server(s) 233 that host the gaming application 221, such as those provided via AWS would still host the gaming application 221, but the application system would be integrated within the enterprise internal core 251. The processes and systems described herein are not limited to the example flow diagram 201, and various other network flow communications may alternatively be implemented that would facilitate access to the gaming application 221.

In one or more embodiment, a system and a corresponding method are implemented for generating a gaming graphical user interface for conducting gaming and other digital diversions. Games and other diversions can be implemented in which a player is engaged via a player device in exchanges of questions and answers and/or in navigable virtual gaming environments of any dimension. Subject matters perused can be educational toward, for example, products and services including investment vehicles and other financial activities offered or dispatched by a first entity. Games and other diversion vehicles dispatched by a first entity can convey and/or guide user attention and activity trajectories toward product and service vehicles dispatched by the first entity.

Tokens representing earned rewards, access thereto, or access to upcoming chances to win, can be won by the player providing correct answers questions and/or be successful in games of skill and/or chance. Gaming sessions may be offered periodically, and in a limited way. For example, a player may be permitted a limited number of questions, trials, or events in any given time period. In at least one example, a session of limited activities is freely permitted a player in any given consecutive twenty four hours or in any given calendar day. In some examples, further trials beyond some threshold may not be purchased, thereby preventing over use and limiting overlap of possible other pay-to-play or paid access games, products and services. In some examples, games of chance and/or skill are offered for which membership fees are charged and/or pay-to-play tokens are available, and/or virtual wallets or accounts are decremented for playing costs and incremented for winnings. In some examples, offerings include games, cards, and/or number sequences for purchase and/or use, each with or without potential for winning funds and/or extended playing.

As a gaming host or service provider, a first entity is advantaged by determining which of existing clients, with reference to users of at least one other service and/or product, and which other parties, with reference to consumers and other entities without current client engagement, would be likely users of gaming and other digital diversion vehicles provided by the first entity. To identify likely-interested parties, their prior behaviors can be studied and quantified with regard to predictive trends by identification of attributes referring to activities and behavior with correlations to use or likelihood of using first entity gaming services and products. Marketing can be targeted to users that are deemed likely to respond and, for example, use a gaming app. The power of machine learning algorithms toward analyzing large datasets and identifying patterns is leveraged to predict user behavior. Non-limiting examples of classification models used to determine success level of gaming apps include artificial neural networks (ANN), K nearest neighbor (KNN), supervised learning algorithm (SVM), random forest, and logistic regression.

The game-offering entity, or first entity, can in various implementation be described as an enterprise entity, a business entity, a retailer, a merchant entity, a financial institution, a bank, or other service and/or product provider. As such, the first entity may maintain or have access to, user profiles and accounts. Activities dispatched for any given user or group thereof can be tailored, according to user information maintained in or in association with such user profiles and accounts.

A computer-implemented model is trained based in part on behavior of those that actually using one or more gaming applications. Their activity profiles are compared to those of a larger population, for example of those that have other transactional behaviors, for example with little affinity for gaming and/or abstaining. Thus, the model is trained with both positive correlation examples negative correlation examples. The trained model is used to forecast which potential users are likely to have some propensity to use one or more gaming application. Users with relatively higher forecasted likelihood of gaming use have heightened likelihood to respond to marketing and promotional information regarding gaming, in comparison to others with relatively lower forecasted likelihood. Users that are heavy gamers may be excluded, having no or little need for further gaming or marketing thereof. A threshold criterion is derived or set to segment and define users to which signaling conveying promotional information is throttled. User information accessed and utilized can include, as non-limiting examples: amounts in savings accounts and deposit accounts; income levels according to direct access or proxy income information such as from third party sources including credit agencies and partner and/or associate businesses and entities; resource transfers in and/or out of accounts; and demographic data such as age and education level.

In the interest of focusing resources, the trained model is used to efficiently identify a likely client base for gaming, and can thus facilitate very nimble and efficient marketing, for example by ranking, ordering, and/or segmenting a group of clients to whom marketing is preferred. This serves both client interests and first entity interests, and by focusing digital communications for disseminating promotional information to limited target groups in lieu of indiscriminate wide casting, reduces data traffic on network connections, improves network efficiencies, and reduces latencies and operating costs.

In at least the immediately below descriptions, reference numbers are provided correlating terms to examples of elements in various ones of the drawings (FIGS), without limitation of those terms to such correlations. Implemented as a system 200, a computing system 206 of a first entity includes one or more processor 220 configured to execute computer-readable instructions 226, at least one of a memory device 222 and a non-transitory storage device 224, and a communication interface 236 for operatively connecting, via a communication network 258, the one or more processor to user devices (104, 106) associated with particular users. Upon executing the computer-readable instructions, the one or more processor operates the computing system to automatically take prescribed steps of action implemented in at least one embodiment in cooperation at least in part with a user's device with reference to the above descriptions of the user computing device 104 and the user mobile device 106.

The steps of action may at least in part be implement by use of an artificial intelligence (AI) algorithm. For example, user activities can be discriminated as having or being digital diversion attributes, referring to a correlation between such an activity and use or likelihood of use of diversion vehicles such as gaming and other online and/or computer implemented education and entertainment activities. Where digital diversion attributes are detected, a trajectory of events and activities that a user entity is likely to contact by use or at least interest can be calculated and forward tracked. Forward tracking of a user-specific contact trajectory is determinative of capacity for use intersection of the specific user entity with particular diversion vehicles. A threshold criterion is applied in that, upon the determined capacity satisfying at least one threshold criterion, signaling the specific user entity via associated user devices can be throttled, with reference to increasing, focusing, or sending information, diversion activities, diversion opportunities, and/or other promotional content to the specific user. The throttled signaling in some examples includes image or other graphical indicia content for display at least in part by specific user devices, for example thereby at least identifying a first-entity dispatched diversion vehicle for which likely intersection by the user is forecasted according to the forward tracking of the calculated contact trajectory of the user entity. Thus, information proffered by the first entity is tailored to user interest and increases likelihood of deepening engagement with the first entity. User attention to a first-entity dispatched diversion vehicle such as a gaming application proffered by the first entity is sought by segmented signaling sent to users having likelihood of use, the signals sent including information about one or more specific first entity dispatched gaming application, such as a link for downloading one or more gaming application, an advertisement for one or more gaming application, a coupon for reduction or waiver of cost or purchase of one or more gaming application, and/or an invitation to play one or more gaming application.

Before proceeding with further descriptions of the inventive forward tracking of user contact trajectories, these description turn now to FIG. 2A through FIG. 6. As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools including, but not limited to Logistic Regression (LR), Naive-Bayes, Random Forest (RF), matrix factorization, and support vector machines (SVMs) in addition to, or as an alternative to, one or more neural networks, as described herein.

FIG. 6 is a flow chart representing a method 600, according to at least one embodiment, of model development and deployment by machine learning. The method 600 represents at least one example of a machine learning workflow and/or iterative model training algorithm in which steps are implemented for machine learning.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

With particular regard to use of an artificial intelligence (AI) algorithm to discriminate user activities as having or being digital diversion attributes, for example to determine correlations between activities and use or likelihood of use of diversion vehicles such as gaming and other online and/or computer implemented education and entertainment activities, the usage profiles of existing, known, and/or avid gaming users may be used as data ingested and/or test data. In some implementations, target variables applied in iterative training and testing loops are based on existing users of gaming applications as positive correlation examples, whereas user offered gaming resources but perpetually abstain are used as negative correlation examples, both of which are used in model training in the iterative machine learning work flow. A model algorithm architecture is trained in an iterative training and testing loop, for example as represented in FIG. 6. The outcome of each iteration as to correctly or incorrectly predicting a given behavior such as gaming use for test data of with known behavioral correlations is utilized to iteratively update weights in the calculations to thereby train the model and improve computer functioning in the field of determining and applying digital diversion attributes by which user affinity for gaming can be automatically calculated based on transactional data flows.

False positives are thereby minimized through performance of the above-described iterative training algorithm. The computer implemented model is trained and retrained with updated training sets containing positive and negative test examples. In some examples, direct gaming use evidence such as gaming purchases records and/or data and transactions involving, for example, casinos and lottery operators are found as positive correlation examples and their transactional evidence is discriminated as having or being digital diversion attributes. Other more subtle correlations indiscernible to any feasible human calculation or recognition are feasibly found and quantified only by machine processing, in particular by use of a computer-implemented artificial intelligence (AI) algorithm as described herein to discriminate user activities as having or being digital diversion attributes.

FIG. 7 represents an implementation of systems and methods for discriminating digital diversion attributes and throttling signaling to user devices for display of information at least identifying diversion vehicles for which likely intersection by the users is forecasted according to forward tracking of a calculated contract trajectories. In FIG. 7, the interests, assets, obligations, profits, and liabilities of a household and/or business are those of, or are managed at least in part by, the user entity 110. The user entity 110 may have a "brick and mortar" facility 700 as illustrated in FIG. 7, denoting a home and/or business. Additionally, or alternatively, all variations of which are within the scope of these descriptions, the facility 700 may conduct personal or professional business online or virtually, in whole or in part.

In the illustrated example, a user entity 110 can be a consumer, a client, a family, or other entity or other interested party with regard to a facility 700, which can be a household or a business in non-limiting examples. The user entity 110 can offer or receive any number or type of services and products. In some examples, the user entity 110 receives products 702 as graphically represented in FIG. 7, for example by home or other on-site delivery of online purchased products. In other examples, the user entity 110 receives services. Use of "service(s)" or "product(s)" thus relates to either or both in these descriptions. With regard, for example, to online information and services, "service" and "product" are sometimes termed interchangeably.

The facility 700 and/or user entity 110 operates with multiple costs, shown generally throughout FIG. 7 with corresponding indicia (–$). The facility 700 and/or user entity 110 has income, for example according to earnings by employment 708 at least in the illustrated embodiment, shown generally throughout FIG. 7 with corresponding indicia (+$). FIG. 7 illustrates, representing respective costs (–$), utilities like power 706 and water 710, maintenance and repairs 712, transportation costs with respect to product deliveries, advertising, and various cash expenditures 720 for meals and personal items for members and/or associates and/or employees referenced as 722. FIG. 7 also illustrates, representing respective costs (–$), travel costs 724, health insurance premiums and other medical-related expenditures 726, and costs for training or education 730 such as tuition and other school or college costs for members and/or associates. Each of these expenditures (–$) can be paid via, for example, checks 732 drafted by the user entity, whether checks be in paper form or electronic. The expenditures can be paid by use of credit cards 734, and debit cards 736, and other payment types. These and other transactions can be conducted, for example, online using user devices, represented as a computing device 104 and a mobile device 106 in FIGS. 1 and 7.

According to systems and methods described herein, in at least some embodiments, user interaction with product and service providers 740 can incur both expenditures and income, which can be transacted online and/or at point-of-sale (POS) locations. For example, online media for entertainment outlets offering music and home videos may charge subscriptions fees and/or off monetization of user-provided content. Product and service providers 740 are represented in FIG. 7 to include, as non-limiting examples produced media providers 742 steaming movies and other content, and produced music and audio service providers 744. Mixed digital media providers 746 stream content that is professionally produced and content uploaded by users, which can be monetized. Accordingly, product and service providers 740 can cause both expenditures (−$) and earnings (+$). Further non-limiting examples of online product and service providers 740 representing potentially both expenditures (−$) and earnings (+$) are casinos 750 and lottery operators 752. Casinos 750 having online operations and/or POS operations offer games of chance and/or skill, for which user entities may be charged membership fees and/or may make wagers or may be charged for pay-to-play tokens and/or virtual wallets. Lottery operators 752 having online operations and/or POS operations offer games, cards, or number sequences for purchase, each typically with potential for winning funds. Accordingly, casinos 750 and lottery operators 752 can represent both expenditures (−$) and earnings (+$).

The above-described and other user activities in person, online, in home, and at POS locations can be discriminated as having or being digital diversion attributes so as to better serve the user entity 110 by tailoring the offerings of a first entity to the interests of the user. In some implementations, the first entity 760 provides a service to the user entity 110 and/or facility 700 by use of the enterprise system 200 (FIG. 1) and network 258. The service entity 760 can be described as an enterprise entity, a business entity, a retailer, a merchant entity, a financial institution, a bank, or other service and/or product provider. The service entity 760 can access client data held, acquired, and/or stored for example as described above with reference to the storage device 224 of FIG. 1 and data 234 stored therein. The service entity 760, in some examples, can also utilize available other party data that can be purchased and/or otherwise acquired, for example as described above with reference to the external systems 202 and 204 of FIG. 1.

In some examples, user entities have primacy, referring to the service entity 760 being primary in handling financial flows and transactional data. In such cases, the service entity 760 has direct access to transactional data for one or more of deposits, withdrawals, credit transactions, checking transactions, and other transaction types. Amounts of incoming earnings and outgoing expenditures and more detailed information can be gained from ingesting data via OCR analysis on checks, whether in paper or scanned form. In some examples, the service entity 760 accesses financial flow data and transactional data regarding consumers, businesses, and other entities via third party sources. In some examples, further information, such as credit rating and accounts information, purchases information, data revealing spending habits, and for example gaming use, regarding existing and unregistered users is sought from at least one third party source, for example as described above with reference to the external systems 202 and 204 of FIG. 1A.

Transactional data events for deposits and withdrawals, for credit card and other banking card transactions, purchases, and payments of all sorts are timestamped, recorded, tracked, classified and/or categorized and the data collected is aggregated and utilized to inform users and/or entity agents of attributes and trends, particularly with regard to discriminating events and/or transactions as having or being digital diversion attributes so as to better serve the user entity 110 by tailoring the offerings of a first entity to the interests of the user.

In the non-limiting example of FIG. 7, timestamped events representing, for example, deposits 762 into and payments 764 made out of accounts 766 of the user entity 110 and/or facility 700 are recorded. Determinations are made as to whether categorized expenditures, sometimes termed as discharges herein, are reflective and/or predictive of likelihood of use of, purchase of, and/or interest in any particular first-entity products and services such as diversion vehicles including, as non-limiting examples, gaming and other computer implemented education and entertainment activities.

The earnings, revenues, and other incrementing monetary events (+$) together constitute a stream 762 can be described as quantized input events for which corresponding respective input quantities are fetched from sources for deposit into one or more user account 766. For example, income, revenue from any sales and services provided by the first entity, and any winnings, for example with reference to casinos 750 and lottery operators 752 as non-limiting examples, deposited to the one or more user account 766 represent respective quantized input events for which records are stored with regard to the accounts to which corresponding input quantities are fetched. Fetching relates to incrementing monetary events (+$) and refers to receiving and crediting cash deposits, and to the satisfaction of deposited or incoming checks from other parties, debit card charges, credit card charges, and other payments made to or exacted by the user entity 110 in receiving payments for products and/or services as non-limiting examples.

In the illustrated example of FIG. 7, the expenditures (−$) are decrementing monetary events together constitute a stream 764 of quantized output events for which corresponding respective output quantities are discharged from one or more user account 766 to satisfy cost-related payments, referring to the satisfaction of outgoing checks, incoming debit card charges, credit card charges, and other payments made by or on behalf of the user entity 110 in covering costs and living expenses. For a small business in one example, a net profit according to the sum of fetched increments (+$) less the sum of discharged decrements (−$) is essentially income for the proprietor. For a household, the same represents an opportunity for savings and/or additional purchases.

The above described transactional events for deposits and withdrawals and other user habits and profile characteristics are aggregated as a data set subjected to a computer-implemented artificial intelligence (AI) algorithm as described above to discriminate user activities as having or being digital diversion attributes. To further determine likelihood of use of first-entity selected and/or offered activities, such as gaming, a trajectory of events and activities that a user entity is likely to contact based on user activity attributes is calculated and forward tracked. A calculated trajectory represents forecasted trend behavior of a specific user entity, need not be graphically visualized, and can be a data object of any dimension. In at least one non-limiting example, forward tracking the calculated trajectory is implemented by logistic regression. By forward tracking the calculated trajectory, a determination is made for the capacity for intersection of the specific user entity with at least one first-entity dispatched diversion vehicle, referring to capacity for use of a gaming application provided by the first entity in at least some embodiments.

The determination in some implementations is made based on a modeling determined capacity mathematically defined as a likelihood such as a percentage ranking in comparison with a general client or user population. The capacity for intersection of the specific user entity can be a numeric ranking; and satisfying at least one threshold criterion can be the numeric ranking meeting or exceeding a numeric value. For example, a numeric ranking, order, or score calculated by modeling between zero (0) and one hundred (100) can be determined for each user for which marketing by signaling is under consideration and is subjected to modeling. In such example, users with a numeric ranking between seventy (70) to hundred (100) can be considered as exceeding or meeting the threshold criterion of seventy or greater, and those users are targeted for further engagement with focused communications, messaging, marketing, recruiting, and other initiative or promotive contact collectively termed signaling and/or throttling herein.

Upon the determined capacity satisfying at least one threshold criterion, an operative connection over the network connection, for example see network 258 in FIG. 1A, is established between the computing system 206 of and a specific user device (104, 106) associated with the specific user entity 110. As represented in FIG. 7, a signal 770 is sent via the operative connection to the specific user device for display, by the specific user device. The information at least identifies the first-entity dispatched diversion vehicle, such as a particular gaming application for which likely use by the specific user is expected. The signal sent and referenced as signal 770 can include any and all of, as non-limiting examples, information about a particular gaming application, a link for download or use of a particular gaming application, and an invitation to play a particular gaming application.

In the instances where the user entity 110 represents a household or other user group, and for example where that are multiple, shared, and/or joint accounts, the signal(s) 770 can be directed to one or more primary member, such as a primary card holder on an account and/or a member with signature authority.

A cross check is implemented in some examples to eliminate redundancies and further the interest of efficient resource and network traffic reduction. Prior to such throttling, user's whose determined capacity satisfy or exceed the threshold criterion are further filtered for prior and/or current use of diversion vehicles for which dissemination of further signaling is under consideration. For example, a current user of a particular first-entity dispersed diversion vehicle such as a gaming application is culled from receiving at least some or basic promotional material about that gaming application. In such an implementation, prior to establishing an operative connection over the network connection for sending a referenced signal 770 to a specific user device (104, 106), the computing system automatically confirms that the specific user entity 110 does not utilize the first-entity dispatched diversion vehicle for which the determined capacity satisfied the one threshold criterion.

In some embodiments of the above-described systems and actions thereof, one or more first entity agent receives notification when the determined capacity for intersection of a specific user entity with at least one first-entity dispatched diversion vehicle meets or exceeds the threshold criterion. In such examples, automatic internal communications within the first entity enterprise may be conducted ahead of or in lieu of automatic and/or human assisted promotive contact with the user entity. FIG. 7 accordingly represents sending a signal 780, for example via the network connection 258 and/or an enterprise system 200 internal network connection, to at least one agent device 212 for display, by the agent device, information identifying at least one of the specific user entity, an account of the specific user identity, and the one or more quantized resource of the specific user entity. For example, when determinations are made that certain user entities have heightened likelihood to respond to marketing and promotional information regarding gaming, marketing or client contact specialists may steer those users into further engagement with focused communications, messaging, marketing, recruiting, and other initiative or promotive contact collectively termed signaling and/or throttling herein. The signal 780 includes information identifying at least one of the specific user entity 110, one or more account of the specific user identity, with reference to accounts 766 for example, and the one or more quantized resource of the specific user entity, with reference for example to client holdings such as balances of accounts. Such information can be utilized by the human agent 210 for review or confirmation of the determination of capacity for the user entity 110 for intersection of the specific user entity with at least one first-entity dispatched diversion vehicle. For example the human agent 210 may review tracking data 792 generated by the forward tracking of the user's contact trajectory 794.

The agent 210 represented in FIG. 7 may be a digital agent analyst, a business agent, and/or marketing agent. FIG. 7 represents a back end evaluation event 790 in which at least a portion of tracking data 792 is displayed, for example on one or more agent GUI via agent devices 212. The evaluation event can be characterized as a back end event in that an agent 210 is in attendance without users 110. The tracking data 792 can be displayed in whole or in part in various formats and portions in the evaluation event 790. The tracking data 792, in non-limiting examples, details user actions and interactions with particular products and services of the first entity, such as a gaming application, and of third parties, with reference to the external systems 202 and 204 (FIG. 1A) and/or casinos 750 and lottery operators 752 (FIG. 7). The tracking data can be displayed for agent viewing and evaluation in various data presentation forms, including, as non-limiting examples, pie charts, histograms, bar charts, data plots, timelines, statistical data, tabular data, written reports, text statements, numerical data, forecasts, summaries, spreadsheets, cross sections of multi-dimensional data objects, and other examples of presentation of quantities and findings. Back end evaluation of the tracking data can provide feedback for the creation and/or selection of content further disseminated to users and the design, arrangement, format, and transmission mode of that content. The signal 770 in FIG. 7 represents both automatic promotive contact with the user entity upon the determined capacity satisfying at least one threshold criterion, and contact guided, authorized and/or dispatched by agent 210 during or subsequent to the evaluation event 790.

The agent 210 represented in FIG. 7 also, in some embodiments of systems and methods within the scope of these descriptions, serves to implement supervised initiation and/or supervision of model development and deployment by machine learning as represented in FIG. 6. The agent 210 may manage and/or initiate the machine-learning workflow using select or machine-found positive correlation examples, negative correlation examples, and/or anomaly alerted data as training test data and may insert target variable values into the iterative training and testing loop. For example, propensity models may be generated by which, at least in part, the described digital diversion attributes are discriminated, capacities for intersection of specific user entities with diversion vehicles are determined, and threshold criteria are set and/or adjusted.

User entities, for example those whom marketing by signaling is under consideration and whose trajectories are subjected to modeling, contribute further data and examples for model training by their own continued interactions, replies, and inquiries implemented as user actions via user devices. User entities are guided through a category funnel 796 referenced graphically in FIG. 7, toward a conversion-stage category representing receipt, use, subscription, or purchase of one or more service or product by the user, such as a gaming application. The category funnel approach implemented by systems and methods described herein provides a mechanism for structuring personalization and prioritizing users for further engagement with focused communications, messaging, marketing, recruiting, and other initiative or promotive contact collectively termed signaling and/or throttling herein.

Components affecting personalization include, as non-limiting examples, historical elements such channel of preference for interaction, such as whether a client is highly digitally engaged or a person that goes to POS or service branch quite often.

Games and other diversions implemented can be educational toward a user's financial wellness and guide user's toward selected best use products, services, and information including savings strategies and investment vehicles and other financial activities offered or dispatched by a first entity.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for signaling a networked device with a contact trajectory having capacity for intersection with a diversion vehicle, the system comprising:
   a computing system of a first entity including one or more processors and a memory storing computer-readable instructions; and
   a network interface operatively connecting user devices to the computing system, wherein, upon execution of the computer-readable instructions, the computing system performs steps comprising, for each specific user entity of multiple user entities:
   receiving input event signals and storing corresponding input event records associated with the specific user entity, each of the input event records representing a respective quantized input event;
   incrementing, respectively for each one of at least some of the input event records, one or more respective quantized resource of the specific user entity by a respective input quantity, the respective input quantity fetched by the first entity from a respective other party;
   receiving output event signals and storing corresponding output event records associated with the specific user entity, each of the output event records representing a respective quantized output event;
   decrementing, respectively for each one of at least some of the output event records, a respective output quantity from the one or more quantized resource of the specific user entity, the respective output quantity discharged by the first entity;
   discriminating, by an artificial intelligence (AI) model for at least some of the output event records, a respective at least one digital diversion attribute, wherein the AI model is trained based on training data comprising positive correlation examples and negative correlation examples;
   calculating, by the AI model, a contact trajectory based at least in part on each output event record for which a respective at least one digital diversion attribute is discriminated;
   forward tracking the contact trajectory and determining a numeric ranking reflecting a capacity for intersection of the specific user entity with at least one first-entity dispatched diversion vehicle;
   determining that the specific user entity does not utilize the first-entity dispatched diversion vehicle; and
   based on the numeric ranking satisfying at least one threshold and the determination that the specific user entity does not utilize the first-entity dispatched diversion vehicle:
   establishing a network connection via the network interface between the computing system and a specific user device associated with the specific user entity; and
   sending a signal via the network interface to the specific user device for display, by the specific user device, information at least identifying the first-entity dispatched diversion vehicle.

2. The system according to claim 1, wherein the first-entity dispatched diversion vehicle comprises a gaming application.

3. The system according to claim 2, wherein sending the signal comprises sending at least one of: information about, a link for download or use of, and an invitation to play, the gaming application.

4. The system of claim 1, wherein the system is configured to segment users based on the numeric rankings and throttle signaling to reduce traffic transmitted via the network interface and reduce a utilization of the processor.

5. The system of claim 4, wherein, upon execution of the computer-readable instructions, the computing system performing steps comprising:
   receiving additional training data comprising additional positive correlation examples and additional negative correlation examples;
   retraining the AI model based on the additional training data;
   accessing additional output event records;
   discriminating, by the retrained AI model, a respective additional digital diversion attribute for the additional output event records;
   calculating, by the retrained AI model, another contact trajectory based at least in part on each additional digital diversion attribute;
   forward tracking the another contact trajectory and determining another numeric ranking reflecting another capacity for another intersection of the specific user entity with the at least one first-entity dispatched diversion vehicle;
   based on a determination that the another numeric ranking does not satisfy the at least one threshold, refraining from sending, to the specific user device, additional information associated with the first-entity dispatched diversion vehicle.

6. The system according to claim 1, wherein the AI model comprises an artificial neural network.

7. The system according to claim 6, wherein the artificial neural network is trained using an iterative training algorithm using the positive correlation examples and the negative correlation examples.

8. A system for signaling a networked device with a contact trajectory having capacity for intersection with a diversion vehicle, the system comprising:

a computing system of a first entity including one or more processors and a memory storing computer-readable instructions; and a network interface operatively connecting user devices to the computing system, wherein, upon execution of the computer-readable instructions, the computing system performs steps comprising, for each specific user entity of multiple user entities:

storing output event records associated with the specific user entity, each of the output event records representing a respective quantized output discharged from one or more quantized resource of the specific user entity;

discriminating, by an artificial intelligence (AI) model for at least some of the output event records, a respective at least one digital diversion attribute, wherein the AI model is trained based on training data comprising positive correlation examples and negative correlation examples;

calculating, by the AI model, a contact trajectory based at least in part on each output event record for which a respective at least one digital diversion attribute is discriminated;

forward tracking the contact trajectory and determine a numeric ranking reflecting a capacity for intersection of the specific user entity with at least one first-entity dispatched diversion vehicle;

determining that the specific user entity does not utilize the first-entity dispatched diversion vehicle; and based on the numeric ranking satisfying at least one threshold and the determination that the specific user entity does not utilize the first-entity dispatched diversion vehicle:

establishing a network connection via the network interface between the computing system and a specific user device associated with the specific user entity; and sending a signal via the network interface to the specific user device for display, by the specific user device, information at least identifying the first-entity dispatched diversion vehicle.

9. The system according to claim 8, wherein the first-entity dispatched diversion vehicle comprises a gaming application.

10. The system according to claim 9, wherein sending the signal comprises sending at least one of: information about, a link for download or use of, and an invitation to play, the gaming application.

11. The system according to claim 8, wherein discriminating, for at least some of the output event records, a respective at least one digital diversion attribute comprises using a computer-implemented model trained by machine-learning.

12. The system according to claim 8, wherein the AI model comprises an artificial neural network trained using an iterative training algorithm using the positive correlation examples and the negative correlation examples.

13. The system of claim 8, wherein the system is configured to segment users based on the numeric rankings and throttle signaling to reduce traffic transmitted via the network interface and reduce a utilization of the processor.

14. The system of claim 13, wherein, upon execution of the computer-readable instructions, the computing system performing steps comprising:

receiving additional training data comprising additional positive correlation examples and additional negative correlation examples;

retraining the AI model based on the additional training data;

accessing additional output event records;

discriminating, by the retrained AI model, a respective additional digital diversion attribute for the additional output event records;

calculating, by the retrained AI model, another contact trajectory based at least in part on each additional digital diversion attribute;

forward tracking the another contact trajectory and determining another numeric ranking reflecting another capacity for another intersection of the specific user entity with the at least one first-entity dispatched diversion vehicle;

based on a determination that the another numeric ranking does not satisfy the at least one threshold, refraining from sending, to the specific user device, additional information associated with the first-entity dispatched diversion vehicle.

15. A method for a computing system of a first entity to signal a networked device with a contact trajectory having capacity for intersection with a diversion vehicle, the computing system of the first entity including one or more processors and a memory storing computer-readable instructions, and a network interface connecting user devices to the computing system, the method comprising, upon execution of the computer-readable instructions by the one or more processors, the computing system performing steps comprising, for each specific user entity of multiple user entities:

receiving input event signals and storing corresponding input event records associated with the specific user entity, each of the input event records representing a respective quantized input event;

incrementing, respectively for each one of at least some of the input event records, one or more respective quantized resource of the specific user entity by a respective input quantity, the respective input quantity fetched by the first entity from a respective other party;

storing output event records associated with the specific user entity, each of the output event records representing a respective quantized output event;

decrementing, respectively for each one of at least some of the output event records, a respective output quantity from the one or more quantized resource of the specific user entity, the respective output quantity discharged by the first entity;

discriminating, by an artificial intelligence (AI) model for at least some of the output event records, a respective at least one digital diversion attribute, wherein the AI model is trained based on training data comprising positive correlation examples and negative correlation examples;

calculating, by the AI model, a contact trajectory based at least in part on each output event record for which a respective at least one digital diversion attribute is discriminated;

forward tracking the contact trajectory and determining a numeric ranking reflecting a capacity for intersection of the specific user entity with at least one first-entity dispatched diversion vehicle;

determining that the specific user entity does not utilize the first-entity dispatched diversion vehicle; and based on the numeric ranking satisfying at least one threshold and the determination that the specific user entity does not utilize the first-entity dispatched diversion vehicle:

establishing a network connection via the network interface between the computing system and a specific user device associated with the specific user entity; and sending a signal via the network connection to the specific user device for display, by the specific user device, information at least identifying the first-entity dispatched diversion vehicle.

16. The method according to claim 15, wherein:

the first-entity dispatched diversion vehicle comprises a gaming application;

sending the signal comprises sending at least one of: information about, a link for download or use of, and an invitation to play, the gaming application.

17. The method according to claim 15, wherein the AI model comprises an artificial neural network.

18. The method according to claim 17, wherein the artificial neural network is trained using an iterative training algorithm using the positive correlation examples and the negative correlation examples.

19. The method of claim 15, wherein the method segments users based on the numeric rankings and throttles signaling to reduce traffic transmitted via the network interface and reduce a utilization of the processor.

20. The method of claim 15, further comprising, upon execution of the computer-readable instructions by the one or more processors, the computing system performing steps comprising:

receiving additional training data comprising additional positive correlation examples and additional negative correlation examples;

retraining the AI model based on the additional training data;

accessing additional output event records;

discriminating, by the retrained AI model, a respective additional digital diversion attribute for the additional output event records;

calculating, by the retrained AI model, another contact trajectory based at least in part on each additional digital diversion attribute;

forward tracking the another contact trajectory and determining another numeric ranking reflecting another capacity for another intersection of the specific user entity with the at least one first-entity dispatched diversion vehicle;

based on a determination that the another numeric ranking does not satisfy the at least one threshold, refraining from sending, to the specific user device, additional information associated with the first-entity dispatched diversion vehicle.

\*   \*   \*   \*   \*